(12) United States Patent
Koenhen

(10) Patent No.: US 6,787,216 B1
(45) Date of Patent: Sep. 7, 2004

(54) METHOD FOR MANUFACTURING MULTIPLE CHANNEL MEMBRANES, MULTIPLE CHANNEL MEMBRANES AND THE USE THEREOF IN SEPARATION METHODS

(75) Inventor: Dirk Marinus Koenhen, Dedemsvaart (NL)

(73) Assignee: inge AG, Greifenberg (DE)

( * ) Notice: Subject to any disclaimer, the term of this patent is extended or adjusted under 35 U.S.C. 154(b) by 0 days.

(21) Appl. No.: 10/019,574
(22) PCT Filed: Jun. 29, 2000
(86) PCT No.: PCT/NL00/00455
§ 371 (c)(1), (2), (4) Date: May 3, 2002
(87) PCT Pub. No.: WO01/02085
PCT Pub. Date: Jan. 11, 2001

(30) Foreign Application Priority Data
Jul. 1, 1999 (NL) .................. 1012486

(51) Int. Cl.⁷ ............... B32B 3/20; B01D 46/10; B29C 47/00
(52) U.S. Cl. ............ 428/188; 428/156; 264/177.14; 264/178 R; 264/209.1; 264/211.13; 156/244.13; 55/520; 55/524; 55/498
(58) Field of Search ............... 264/176.1, 177.1, 264/177.12, 177.14, 177.16, 178 R, 209.1, 211, 211.13; 156/244.4, 244.13; 55/307, 520, 522, 524, 211, 273, 498; 428/36.9, 188, 156

(56) References Cited

U.S. PATENT DOCUMENTS 1,677,714 A * 7/1928 Frease ................. 428/188
3,935,357 A * 1/1976 Padovani .............. 428/188
3,941,157 A * 3/1976 Barnett ................ 138/115
4,477,394 A * 10/1984 Armstrong et al. ...... 261/112
4,814,228 A 3/1989 Onorato et al.
4,874,522 A * 10/1989 Okamoto et al. ........ 210/645
5,171,493 A * 12/1992 Aptel et al. ............ 264/41

FOREIGN PATENT DOCUMENTS

| DE | 195 18 624 | 11/1996 |
| EP | 62049911 | 3/1987 |
| FR | 0 294 737 | 12/1988 |
| FR | 2 616 812 | 12/1988 |
| FR | 0 375 003 | 6/1990 |
| FR | 0 375 004 | 6/1990 |
| WO | WO 93/12868 | 7/1993 |

* cited by examiner

Primary Examiner—Donald J. Loney
(74) Attorney, Agent, or Firm—Young & Thompson

(57) ABSTRACT

A method for manufacturing multiple channel membranes includes extruding a polymer solution through an extrusion nozzle wherein several needles are arranged through which a gas or liquid containing a coagulating agent is injected during extrusion, wherein the outer side of the extruded material is first brought into contact with a mild coagulation agent and subsequently with a strong coagulation agent. By using the method a membrane is obtained having parallel channels extending in extrusion direction, in which an active layer is situated in the channels, whereas the outer surface with respect to the active layer has no or hardly any resistance to flows of liquid. By using the method it is possible to make shapes, such as recessed portions, in the membrane circumference. Also disclosed is the use of such membranes in filtration and separation techniques.

16 Claims, 1 Drawing Sheet

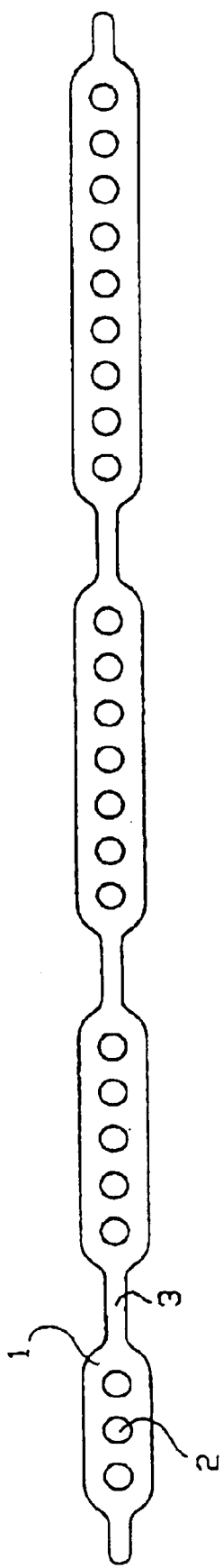
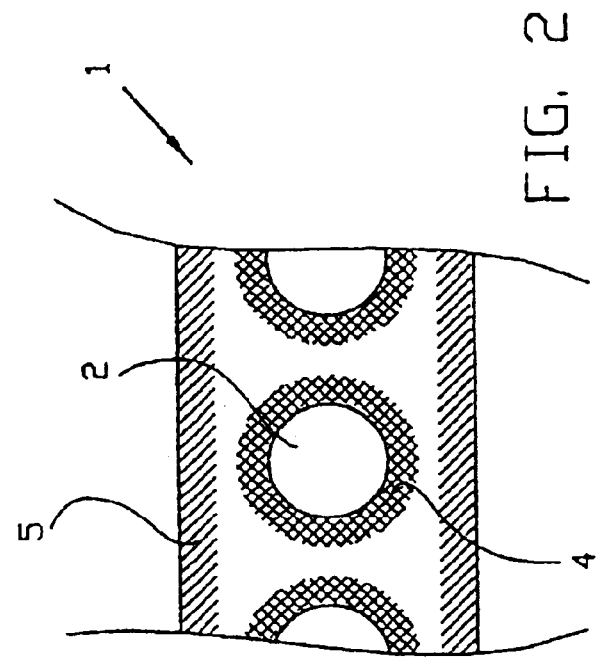
FIG. 1
FIG. 2

US 6,787,216 B1

METHOD FOR MANUFACTURING MULTIPLE CHANNEL MEMBRANES, MULTIPLE CHANNEL MEMBRANES AND THE USE THEREOF IN SEPARATION METHODS

The present invention relates to a method for manufacturing multiple channel membranes by extrusion of a solution of a polymer which can form a semi-permeable membrane after coagulation. The invention further relates to membranes that can be obtained using this method and to the use of said membranes in separation, filtration and purification techniques.

Membranes of semi-permeable materials that are provided with several continuous channels are known.

FR 2,616,812 A relates to a method for manufacturing a porous organic material, particularly an organic semi-permeable membrane, by extruding a solution of a polymer and coagulating it, to an extrusion nozzle for carrying out said method, to the membranes obtained and to filtration modules containing such membranes. According to FR 2,616,812 A a polymer solution is extruded through an extrusion nozzle which is provided with several separated pipes through which a liquid is injected so that an extrudate is formed having several longitudinal channels, and subsequently coagulation is carried out in order to form the porous organic material. By using a non-solvent for the polymer as liquid to be injected, and guiding the extrudate immediately after leaving the extrusion nozzle into a bath containing a non-solvent, an active layer consisting of small pores is formed both in the channels and on the outer surface of the membrane. According to FR 2,616,812 A by first running the extrudate through an air gap prior to guiding it into a bath with a non-solvent, a membrane is obtained having only an active layer in the channels, and by injecting a liquid which does not precipitate the polymer, and guiding the extrudate immediately after leaving the extrusion nozzle into a bath of non-solvent, a membrane having an active layer on the outer surface is obtained. The multiple channel membranes of this reference may for instance be flat or cylindrical.

EP 0,375,003 A1 and EP 0,375,004 A1 relate to the manufacturing of organic semi-permeable membranes provided with several separated channels by means of the method of FR-2,616,812 A. Said references describe in particular the dimensions of the extrusion nozzles, the needles present in them, the dimensions of the channels and the wall thickness of the extruded membrane, the viscosity and the volume of the polymer solution to be extruded and of the injected liquid and the length of the air gap.

The larger mechanical strength, the easy handling and the higher production speed as well as the easy use in filtration modules, are mentioned in FR 2,616,812 A as advantages of the multiple channel membranes with respect to the known hollow-fibre membranes.

FR 2,437,857 A relates to cellulose dialysis membranes in the shape of hollow fibres, in which two or more hollow fibres are connected to each other parallel to the fibre axes. Said membranes are obtained by using an extrusion nozzle provided with conduits through which a liquid is injected which forms the channels.

WO 81/02750 relates to the manufacturing of a membrane unit of a semi-permeable synthetic material provided with a number of parallel tubular channels wherein the synthetic material is extruded through an extrusion nozzle which is provided with a number of thin metal threads or a number of conduits through which a liquid is injected.

DE 3,022,313 A1 relates to multiple hollow fibres, in which the hollow fibres have several separated cavities which extend in the length of the hollow fibre. The multiple hollow fibres are made either by adhering a number of hollow fibres having one cavity to each other, or by extruding a hollow fibre having several cavities, preferably no more than four. The hollow fibres are intended for dialysis.

Above-mentioned dialysis membranes, particularly membranes for kidney dialysis consist of cellulose derivatives. The characterizing feature of said membranes is that the membrane wall is homogeneous and therefore in itself responsible for the resistance against liquid permeability. Because of this the wall is made as thin as possible, usually in the order of 0.15 $\mu$m. Because in dialysis no or hardly any pressure difference is exerted over the membrane said thin wall is no problem. In for instance ultra-filtration and micro-filtration there is indeed a pressure difference and the membrane will have to be able to resist a pressure of at least 3 bar. The thin walls of dialysis membranes are not resistant to such a pressure.

The known semi-permeable membranes are guided into a coagulation bath after extrusion either directly or after running through an air gap. In the first case a separating layer is always formed at the outer surface of the membrane in addition possibly to a separating layer formed in the channels. Using an air gap makes it possible that a membrane is formed which only has a separating layer at the channel side. The length of said air gap should be such that the structure of the membrane is sufficiently fixed by the coagulation liquid which diffuses from the channels into the extruded membrane material, before the membrane enters a coagulation bath for further removal of the soluble components. Because of the length of the air gap the membrane can sag as a result of its own weight while it is still in a substantially liquid condition. As a result it is necessary to use polymer solutions of a high viscosity, such as for instance is described in FR 2,616,812 A, EP 0,375,003 A1 and EP 0,375,001 A1. In order to obtain a polymer solution of a high viscosity, a high concentration of polymer and/or polymer additives are used. As a result the coagulation is slowed down whereas said additives are hard to rinse out. A high concentration of polymer in the solution also gives a membrane having a low flux. Moreover a longer air gap may cause a shape made in the outer surface to disappear due to flow under the influence of surface tension.

By using the methods described above it is not possible to manufacture a membrane of a complex shape, such as a flat multiple channel membrane having recessed portions parallel to the channels, in which an active layer is formed in the channels only.

Methods in which coagulation from one side is effected so that the membrane structure is fixed before the membrane reaches the coagulation bath, suffer from the drawback that no larger wall thicknesses can be produced so that the diameters of the channels are strongly limited.

An object of the invention is therefore to provide a method for the manufacturing of multiple channel membranes which do not entail the above-mentioned drawbacks.

Said objective is achieved according to the invention by a method for manufacturing multiple channel membranes, wherein a solution of a polymer which forms a semi-permeable membrane after coagulation, is extruded through an extrusion nozzle wherein several hollow needles are arranged, a gas containing coagulating vapour or a coagulating liquid is injected through the hollow needles into the extruded material during extrusion, so that parallel continuous channels extending in extrusion direction are formed in the extruded material, and the outer surface of the membrane is brought into contact with coagulation agents, characterized in that the outer surface of the membrane after it leaves the extrusion nozzle is first brought into contact with a mild coagulation agent such that the shape of the membrane is fixed without an active layer being formed on the outer surface of the membrane and subsequently the membrane is brought into contact with a strong coagulation agent.

By using the method according to the invention it is possible to control the pore size on the outer surface of the membrane and those in the channels independent from each other. As a result a membrane can be obtained having a separating layer in the channels in which the outer surface with respect to the active layer has no or hardly any resistance against liquid flows in for instance micro- or ultra-filtration.

In the method according to the invention coagulation takes place from two sides, which results in the coagulation distances being reduced up to a factor two.

The distance above the coagulation tank where the partly liquid membrane has to hang from itself becomes much smaller because the largest part of the coagulation takes place in the coagulation/rinse bath. In the coagulation bath the difference in specific weight between the membrane and the bath is very small in case of usual polymers and solvents. The coagulation path (residence time) in such a bath can be chosen to be as long as necessary. As a result also thin viscous solutions can be spun. It appeared that by using the methods of the present invention multiple channel membranes can be formed from the low viscous polymer solutions according to WO 99/02248, which according to said reference are only suitable for the manufacturing of flat membranes on carriers and not for the manufacturing of capillary membranes. In a membrane obtained with such a thin solution only low molecular substances are present that can easily be removed.

With the method of the invention it is possible to make shapes, such as recessed portions parallel to the channels having a larger cross-section in the outer circumference of the membrane.

According to a preferred embodiment of the method according to the invention a solution, for which water is a non-solvent, is brought into contact with a vapour having a relatively high water vapour tension as mild coagulation agent, after leaving the extrusion nozzle.

In this vapour path some water diffuses into the outer layer of the extruded material so that at that location superficial separation occurs and a coarser pore structure is formed. Then the membrane is submersed in water as a result of which the structure of the membrane is fixed.

According to another embodiment a mild coagulation agent is applied on the extruded material by means of an additional outlet on the circumference of the extrusion nozzle.

By bringing the extruded material in contact with a mild coagulation agent both in the channels and on the outer surface, it is possible to obtain a membrane having an active layer consisting of micro-pores both in the channels and on the outer surface, in which between said active layers a layer having larger pores is situated.

The invention further provides membranes obtained by using the method of the invention.

A preferred embodiment of the membranes according to the invention comprises a flat multiple channel membrane having recessed portions without channels extending parallel to the channels, in which the separating layer is arranged in the channels and the outer surface with respect to the active layer has no or hardly any resistance against flows of liquid.

Such a membrane is particularly suitable for use in spiral wound elements as described in U.S. Pat. No. 4,756,835. Because of the presence of the recessed portions without channels the flat membrane of the invention is less rigid than the known flat membranes and is less resistant to rolling up. Flat multiple channel membranes have a certain rigidity and when rolling up the membrane it obtains a curvature radius because of which, as a result of the shape of the membrane, a tensile stress arises on one side and a compression arises on the other side, as a result of which channels can be deformed and the pores can be influenced. It appeared that already with a limited number of recessed portions a membrane that can be rolled up well can be obtained. Contrary to the membrane of U.S. Pat. No. 4,756,835 which is built up from membrane sheets having grooves that are placed against each other, the present membrane is extruded in one go. As a result circular channels can easily be obtained. In order to achieve that in the membranes of U.S. Pat. No. 4,756,835, the membrane sheets have to be laid on each other with great precision, which is a problem with larger sheets. When manufacturing a spiral wound element this becomes even worse, because way length differences then occur between inner membrane sheet and outer membrane sheet, as a result of which the grooves shift with respect to each other. The consequence is that the optimal flow pattern is disrupted and dead cavities are formed. With respect to the membranes of U.S. Pat. No. 4,756,835 the present membranes have the further advantage that no delamination of the sheets leading to large leakage flows will occur.

A spiral wound membrane having the active layer in the channels has the advantage that it is possible to make an element having a capillary membrane in the much quicker and more efficient way used for capillary membranes, whereas the better defined flow of a capillary element is preserved.

Another preferred embodiment of the membrane according to the invention is a cylindrical multiple channel membrane in which the active layer is arranged in the channels, in which the surface area of the channels is more than 1.5 times the outer surface area and the outer surface with respect to the active layer in the channels has no or hardly any resistance to flows of liquid. A cylindrical membrane having a larger diameter and a large number of channels can be mounted in a hollow fibre element considerably easier and is mechanically more stable than a number of single hollow fibre membranes having the same channel size. In a cylindrical membrane having a large number of channels the ratio between the total channel surface area and the outer surface area is large. This is no problem in the membranes according to the invention because the active layer is situated in the channels. In case there would also be an active layer on the outer surface, the resistance against liquid flows is considerable.

Because a membrane having several channels is extruded in one go, a larger mechanical stability is obtained with respect to single channels having a same channel size.

As a result of the larger mechanical stability, the membranes according to the invention are particularly suitable for cleansing by back washing. That means that the filtration direction is periodically reversed so that a possible fouling layer formed in the channels is lifted and can be removed. Said technique is mainly used in ultra-filtration and microfiltration.

The membrane material is preferably a soluble thermoplastic polymer. Suitable polymers are known to the expert. Examples are polysulfones, poly (ether sulfones), polyvinylidene chloride, polyvinylidene fluoride, polyvinyl chloride, polyacrylonitrile, etc. The polymer is dissolved prior to extrusion in a usual solvent and additives can be added. A usual solvent is N-methylpyrrolidone.

Coagulation agents are known to the expert. Many used coagulation agents are non-solvents for the polymer that are miscible with the solvent. The choice for the non-solvent depends on the polymer and the solvent. A solvent used much is N-methylpyrrolidone. Examples of non-solvents for use with this solvent are dimethylformamide, dimethyl sulfoxide and water. The strength of the coagulation agent can be adjusted by the choice of the combination solvent/ non-solvent and the ratio solvent/non-solvent. The coagulation can also be performed with a liquid that is not related to the solvent.

It is also possible to form a separating layer by applying a coating in the channels. Coating materials usual to that end are known to the expert. A survey of suitable coating materials is given by Robert J. Petersen in Journal of Membrane Science 83 , 81–150 (1993).

The diameter of the channels of the multiple channel membranes of the invention is between 0.1 and 8 mm and preferably between 0.1 and 6 mm. The thickness of the walls is adjusted to the pressure to be exerted in the channels depending on the intended use, such as for instance microfiltration, ultra-filtration, nano-filtration, gas separation and reverse osmosis. In general the thickness of the walls is between 0.05 and 1.5 mm and preferably between 0.1–0.5 mm. The cylindrical membranes contain at least four and preferably 7 to 19 channels. The diameter of the cylindrical membrane generally is between 1 to 20 mm and preferably between 2 and 10 mm.

The locations of the recessed portions, which according the invention are provided in the flat membranes so that they can be rolled up better, depend on the wanted curvature radius. Because in a spiral wound element the curvature radius near the axis is smaller than further removed from the axis, fewer recessed portions may be made in the portion that is further removed from the axis than in the portion close to the axis. Preferably recessed portions are made at the edges of the membrane to prevent deformation of the outer channels. Recessed portions are preferably made opposite each other in the upper and lower surface of the membrane. The depth of the recessed portion is generally between 10 and 45% of the membrane thickness, for instance between 20 and 40%, and its width is between 0.5 and 6 times and preferably between 1 and 3 times the channel diameter.

FIG. 1 shows a schematic view of the cross-section of a flat membrane having recessed portions according to the invention. In FIG. 1, 1 refers to the membrane, 2 refers to a channel and 3 refers to a recessed portion. FIG. 2 schematically shows a cross-section of the structure of the membrane around a channel. In FIG. 2, 1 refers to the membrane, 2 refers to a channel, 4 refers to the active layer which is arranged in the channels and 5 refers to the layer of controlled pore size on the outer surface, which with respect to the active layer in the channels, has no or hardly any resistance to flows of liquid.

EXAMPLE 1-Flat membrane

A polymer solution of 20% poly (ether sulfone) (Amoco Radel A100), 9% polyvinylpyrrolidone (PVP) (ISP, K90), 10% glycerin and 61% N-methylpyrrolidone (NMP) was extruded through a rectangular extrusion nozzle having a width of 200 mm and 160 needles of 0.8 mm and at the location of the needles having a thickness of 1.2 mm, provided with three elevated portions having a thickness of 0.4 mm and a length of 2 mm on the positions 10, 50 and 100 mm from the edge.

A solution of 40% NMP in 60% water was injected through the needles as a result of which channels were formed in the polymer solution. The diameter of the channels was 0.9 mm, the thickness on the portions having channels was 1.3 mm and the recessed portions were 0.4 mm thick.

The extrusion speed was 7 m/min, the coagulation bath had a temperature of 80° C. and the length of the path through vapour was 20 cm. (water vapour having a relative humidity of 80 to 100% at 60° C.)

After rinsing and removal of the superfluous PVP a membrane was obtained having a flux of 1350 $l/m^2/h/bar$ (in relation to the channels). The cut-off value was 120,000 D. The pores in the outer surface were 2 micron.

The membrane sheet was very well flexible on the notches and suitable for spiral wound manufacturing.

EXAMPLE 2-Flat membrane

In the same way as in example 1 a membrane was extruded, but now with 52% NMP in 48% water as the injection liquid. After treatment a membrane having a flux of 2500 $l/m^2/h/bar$ and a pore size of 0.1 micron was obtained. The pores in the outer surface were 2 micron. This membrane sheet as well was suitable for spiral wound manufacturing.

EXAMPLE 3-Cylindrical membrane

A polymer solution of 20% poly (ether sulfone) (Amoco Radel A100), 9% polyvinylpyrrolidone (ISP, K90), 10% glycerin and 61% N-methylpyrrolidone (NMP) was extruded through an extrusion nozzle having a diameter of 3.4 mm and 7 needles of 0.8 mm.

A solution of 40% NMP in 60% water was injected through the needles as a result of which channels were formed in the polymer solution. The diameter of the channels was 0.9 mm, the total diameter was 3.4 mm.

The extrusion speed was 7 m min, the coagulation bath had a temperature of 80° C. and the length of the path through water vapour was 20 cm.

After rinsing and removal of the superfluous PVP a membrane was obtained having a flux of 1400 $l/m^2/h/bar$ (in relation to the channels). The cut-off value was 125,000 D. The pores in the outer surface were 2 micron.

EXAMPLE 4-Cylindrical membrane

In the same way as in example 3 a membrane was extruded, but now with 52% NMP in 48% water as the injection liquid. After treatment a membrane having a flux of 3000 $l/m^2/h/bar$ and a pore size of 0.1 micron was obtained. The pores in the outer surface were 2 micron.

EXAMPLE 5-Cylindrical membrane

A polymer solution of 15% poly (ether sulfone) (Amoco Radel A100), 38% propionic acid and 47% N-methylpyrrolidone was extruded through the extrusion nozzle as used in example 3. The solution had a viscosity of approximately 100 cP. A solution of 10% NMP in 90% water was injected through the needles, as a result of which channels were formed in the extruded polymer solution. The diameter of the channels was 1 mm and the total diameter was 4.1 mm. The extrusion speed was 7 m/min, the coagulation bath had a temperature of 70° C. and the length of the path through water vapour was 10 cm. After rinsing a membrane was obtained having a flux of 800 l/m$^2$/h/bar. The cut-off value was 30,000 Dalton. The pores in the outer surface were 0.5 micron.

What is claimed is:

1. Method for manufacturing multiple channel membranes, wherein a solution of a polymer which forms a semi-permeable membrane after coagulation, is extruded through an extrusion nozzle wherein several hollow needles are arranged, a gas containing coagulating vapour or a coagulating liquid is injected through the hollow needles into the extruded material during extrusion, so that parallel continuous channels extending in extrusion direction are formed in the extruded material, and the outer surface of the membrane is brought into contact with coagulation agents characterized in that the outer surface of the membrane after it leaves the extrusion nozzle is first brought into contact with a mild coagulation agent such that the shape of the membrane is fixed without an active layer being formed on the outer surface of the membrane and subsequently the membrane is brought into contact with a strong coagulation agent.

2. Method according to claim 1, wherein the mild coagulation agent is water vapour.

3. Method according to claim 1, wherein the mild coagulation agent is a liquid which is applied on the extruded material by means of an additional outlet on the circumference of the extrusion nozzle.

4. Method according to claim 1, further comprising providing a separating layer by coating on the surface of the membrane in the channels.

5. Method according to claim 1, wherein the extrusion nozzle at the circumference is provided with elevated portions, so that a membrane having recessed portions in the outer circumference extending in the extrusion direction, is obtained.

6. Spiral-wound filtration element, comprising:
   one or more multiple channel membranes produced by the method according to claim 1,
   each membrane in the form of a surface with channel-free recessed portions extending parallel to the channels,
   the membranes wound around a central axis and having the channels running in the direction of the axis of the winding, wherein,
   an active layer is arranged in the channels,
   no active layer is provided on an outer surface, and
   any resistance against liquid flows is predominantly determined by the active layer.

7. Method according to claim 2, further comprising providing a separating layer by coating on the surface of the membrane in the channels.

8. Method according to claim 3, further comprising providing a separating layer by coating on the surface of the membrane in the channels.

9. Method according to claim 2, wherein the extrusion nozzle at the circumference is provided with elevated portions, so that a membrane having recessed portions in the outer circumference extending in the extrusion direction, is obtained.

10. Method according to claim 3, wherein the extrusion nozzle at the circumference is provided with elevated portions, so that a membrane has recessed portions in the outer circumference extending in the extrusion direction, is obtained.

11. Method according to claim 4, wherein the extrusion nozzle at the circumference is provided with elevated portions, so that a membrane having recessed portions in the outer circumference extending in the extrusion direction, is obtained.

12. Method according to claim 1, wherein the hollow needles are arranged within a circular extrusion nozzle so that a cylindrical multiple channel semi-permeable membrane is formed.

13. Method according to claim 12, wherein four or more hollow needles are arranged within the circular extrusion nozzle.

14. Method according to claim 1, wherein the needles are arranged in a row within a rectangular nozzle so that a flat sheet membrane is formed.

15. Method according to claim 5, wherein the needles are arranged in a row within a rectangular nozzle so that a flat sheet membrane having recessed portion without channels extending parallel to the channels is formed.

16. Method according to claim 15, further comprising the step of winding the flat sheet membrane spirally round a central axis and placing the wound membrane in a housing, to produce a spiral-wound membrane.

* * * * *